United States Patent
Inage

(10) Patent No.: US 8,184,345 B2
(45) Date of Patent: May 22, 2012

(54) IMAGE READING DEVICE AND IMAGE FORMING APPARATUS

(75) Inventor: Osamu Inage, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 874 days.

(21) Appl. No.: 12/246,539

(22) Filed: Oct. 7, 2008

(65) Prior Publication Data

US 2009/0128864 A1 May 21, 2009

(30) Foreign Application Priority Data

Nov. 19, 2007 (JP) ................................. 2007-299625

(51) Int. Cl.
*H04N 1/40* (2006.01)

(52) U.S. Cl. ...... 358/448; 358/474; 358/1.13; 358/1.15; 358/497; 382/162; 382/231; 399/82; 399/85

(58) Field of Classification Search .................. 358/474, 358/448, 1.13, 1.15, 501, 505, 518, 516, 358/497, 496; 399/82, 85, 223, 167, 226, 399/227; 382/162, 231, 254, 275, 312
See application file for complete search history.

(56) References Cited

U.S. PATENT DOCUMENTS

| | | | | |
|---|---|---|---|---|
| 6,631,219 B2 * | 10/2003 | Yushiya et al. | ............... | 382/312 |
| 6,701,100 B2 * | 3/2004 | Tamiya et al. | .................. | 399/66 |
| 6,771,397 B2 * | 8/2004 | Hashizume | ................... | 358/474 |
| 7,119,932 B2 * | 10/2006 | Sato et al. | ..................... | 358/474 |
| 7,266,315 B2 * | 9/2007 | Sato | ................................. | 399/38 |
| 7,446,909 B2 * | 11/2008 | Hashizume | ................... | 358/474 |
| 7,626,735 B2 * | 12/2009 | Mizuhashi et al. | ........... | 358/474 |
| 7,679,796 B2 * | 3/2010 | Shoda | ........................... | 358/518 |
| 7,751,071 B2 * | 7/2010 | Namizuka | .................... | 358/1.13 |
| 7,782,498 B2 * | 8/2010 | Hoshi | ........................... | 358/474 |
| 7,783,222 B2 * | 8/2010 | Ono | .................................. | 399/82 |
| 2001/0014227 A1 * | 8/2001 | Asakawa | ........................ | 399/51 |
| 2002/0054383 A1 * | 5/2002 | Sato et al. | ..................... | 358/504 |
| 2004/0037581 A1 * | 2/2004 | Maeda | ............................ | 399/82 |
| 2004/0057079 A1 * | 3/2004 | Ohsawa | ........................ | 358/2.1 |
| 2004/0091280 A1 * | 5/2004 | Ono | ............................... | 399/82 |
| 2007/0216962 A1 | 9/2007 | Inage | | |

FOREIGN PATENT DOCUMENTS

| | | |
|---|---|---|
| JP | 11-136454 | 5/1999 |
| JP | 3553363 | 5/2004 |

* cited by examiner

*Primary Examiner* — Negussie Worku
(74) *Attorney, Agent, or Firm* — Oblon, Spivak, McClelland, Maier & Neustadt, L.L.P.

(57) ABSTRACT

In a first mode, an original is read with a first and a second carriages stopped. In a second mode, the original is read with the first and the second carriages moving in a sub-scanning direction with a distance between the original and an optical reading element kept constant. A control unit causes, if a predetermined condition is satisfied after reading the original in the first mode, the first and the second carriages to standby at a reading position of the first mode while keeping the light source turned on, and if a next read request is issued within a predetermined time, causes the first and the second carriages to move to a next reading operation.

9 Claims, 16 Drawing Sheets

IMAGE READING DEVICE AND IMAGE FORMING APPARATUS

CROSS-REFERENCE TO RELATED APPLICATIONS

The present application claims priority to and incorporates by reference the entire contents of Japanese priority document 2007-299625 filed in Japan on Nov. 19, 2007.

BACKGROUND OF THE INVENTION

1. Field of the Invention

The present invention relates to an image reading device for a digital copier, a scanner, a facsimile, and the like and an image forming apparatus that employs the image reading device.

2. Description of the Related Art

The TWAIN is known as one of technical standards for connecting an image input device such as a scanner, a digital camera, and the like to a personal computer, which means that, if a device is compatible with the TWAIN, an image can be input from all application softwares that are compatible with the TWAIN.

Technologies related to an image reading device are disclosed in, for example, Japanese Patent Publication No. 3553363 and Japanese Patent Application Laid-open No. H11-136454. A digital image reading device, which is disclosed in Japanese Patent Publication No. 3553363, irradiates and reads a standard plate and carries out shading correction. In the digital image reading device, a predetermined speed priority mode and a predetermined image quality priority mode can be randomly set for an image reading operation. Upon completion of a string of the image reading operation, the digital image reading device irradiates and reads the standard plate, and if the next image reading operation is set to the speed priority mode mentioned earlier, the digital image reading device uses shading correction values that use the previously read data. If the next image reading operation is set to the image quality priority mode mentioned earlier, the digital image reading device again irradiates and reads the standard plate before start of the image reading operation and uses the shading correction values that use the obtained read data.

In the invention disclosed in Japanese Patent Application Laid-open No. H11-136454, a read scanner and a read control unit are included for enhancing efficiency of a repeated copying operation and for ensuring that a writing position, when repeatedly reading the same original during reading of a color original, on a photosensitive drum is aligned in time. During a string of the image reading operation, the read scanner scans the original and reads an image. At the time of initial reading of a string of the image reading operation, the read control unit causes the read scanner to start reading from a first position. From the second reading onwards, the read control unit causes the read scanner to start reading from a second position that is nearer to a position of the original than the first position. Upon completion of the string of the image reading operation, the read control unit returns the read scanner to the first position.

In the invention disclosed in Japanese Patent Publication No. 3553363, at the time of reading in the speed priority (black and white (B&W)) mode, shading correction is executed based on a standard white plate data that is read after the previous reading operation. At the time of reading in the image quality priority (color) mode, the standard white plate data is again read before reading the original to execute the shading correction. Thus, when reading in the speed priority mode, productivity is enhanced by tacitly accepting image quality deterioration.

However, when reading in the speed priority mode, a time before using the standard white plate data, which is read after the previous reading operation, is not clearly known. According to Japanese Patent Publication No. 3553363, the shading correction values do not change significantly in a short time. However, an actual lamp luminance includes temperature characteristics. For example, in a xenon lamp that is widely used currently, a difference between lamp temperatures at the time of luminescence is ten percent. In other words, illuminance when the lamp is hot and when the lamp is cold differs by approximately ten percent. If the shading correction values increase by ten percent, the corrected original data becomes darker by ten percent. Due to this, a white patch of the original is likely to become data that is black textured and that includes significant noise.

Further, for increasing the productivity of continuous reading, many of the currently used scanners use a sheet through (hereinafter, "DF") reading mode in which a sheet shaped original is moved and image data is read by a stopped optical system. In DF reading for copying, reading can be executed by subsequently moving the originals based on an internal timing of the scanner. However, when reading using the TWAIN, the reading operation needs to be completed for each page. Further, because read data is uploaded on a network, the reading operation depends on a use environment. Due to this, a command to start reading the next original is delayed. Thus, productivity when using the TWAIN is lower compared to the productivity in the DF reading mode for copying.

Upon completion of reading one original or a string of the originals, the lamp of the scanner is switched off as a sequence at the time of completion. Even if a read start request is issued after the sequence mentioned earlier, the scanner cannot start reading immediately and reading is started only after a waiting time until the lamp is switched on and a light amount has stabilized. Due to this, the productivity when reading using the TWAIN is further reduced.

FIGS. 1A and 1B are flowcharts of a representative operation of the existing scanner. In the existing scanner, an illumination lamp is switched on when scanning starts (Step S101) and whether a reading mode is a color mode or a black and white (B&W) mode is checked (Step S102). Next, operation settings are carried out according to the reading mode (the color mode or the B&W mode). Settings, which differ according to the reading mode such as setting of a line period, setting of an amplification factor that amplifies a charge coupled device (CCD) output and the like, are carried out (Step S103). Next, the scanner checks whether the reading mode is the DF mode or a book mode (Step S104). If the reading mode is the DF mode, the scanner executes a subsequent process after Step S105. If the reading mode is the book mode, the scanner executes a process of the book mode. The book mode indicates a reading mode in which the original, especially a thick book, is placed on a contact glass and the original is read by moving the scanner in a sub-scanning direction. However, because the book mode is not treated as a target in the present invention, an explanation is omitted.

If the reading mode is the DF mode, the scanner carries out setting operations for a DF mode read setting (Step S105), a DF scan motor drive setting (Step S106), a black level detection (Step S107), and setting of an interline correction amount for white plate reading (Step S108). Next, the scanner drives a stepping motor (Step S109), and reads the standard white plate to retrieve shading data while shuttling a carriage between an original reading position (hereinafter, also referred to as "a home position (HP)") and the standard white plate (Step S110). Next, the scanner sets the interline correction amount for reading the original (Step S111) and stops the carriage at the home position, thus enabling reading of the original, and reads the original using the DF (Step S112). Next, the scanner checks whether a read request has been issued (Step S113).

At Steps S105 and S106, the scanner carries out the operation settings that are compatible with the DF reading mode. The operation settings include a gray balance adjustment for deciding a dynamic range of reading and an output balance of red, green, and blue (RGB). Further, the scanner also sets a stepping motor driving pattern for shuttling the carriage between the standard white plate and the HP.

During the black level detection at Step S107, the scanner reads a black level that becomes a standard level of the image data. The scanner sets at Step S108, the interline correction amount that is an interline correction amount for reading the standard white plate. In other words, because an RGB sensor of a CCD is physically positioned towards the sub-scanning direction, the interline correction amount indicates a data delay amount that delays data that is read temporally earlier, thus aligning RGB data. Setting of the interline correction amount at Step S111 is similar to the data delay amount that is processed at Step S108 for reading the original.

If the read request has been issued at Step S113, the process returns to Step S107 and the scanner carries out the reading operation of the next original. If the read request has not been issued, the scanner waits until lapse of 2500 milliseconds (ms) after completion of reading of the original and checks whether a read request has been issued (Step S115). If the read request is issued within the waiting time mentioned earlier, the process returns to Step S102 and the scanner carries out the next reading operation. Upon lapse of 2500 ms from the completion of reading of the original, in other words, upon completion of the waiting time (Yes at Step S114), the scanner switches off the illumination lamp (Step S116), thus ending the process.

Such a control is carried out for avoiding a reduction in the productivity. In the example shown in FIGS. 1A and 1B, the scanner is controlled such that a margin of a predetermined time (2500 ms at Step S114) is allocated and the scanner waits without switching off the illumination lamp within the predetermined time. If the read request is issued within the predetermined time, the scanner can carry out scanning immediately. The waiting time mentioned earlier is merely an example, and the waiting time can be appropriately set according to the functions and use of a device.

However, due to the control mentioned earlier, because the illumination lamp is always switched on during the predetermined time, a life of the illumination lamp is reduced.

SUMMARY OF THE INVENTION

It is an object of the present invention to at least partially solve the problems in the conventional technology.

According to one aspect of the present invention, there is provided an image reading device that includes an original feeding unit that feeds a sheet-type original to a predetermined reading position, a first carriage equipped with a light source and a first mirror, and a second carriage equipped with a second mirror and a third mirror, the image reading device having a first mode and a second mode. In the first mode, the image reading device reads image data on the original while moving the original with the first and the second carriages stopped, and in a second mode, the image reading device reads image data on the original by moving the first and the second carriages in a sub-scanning direction while keeping a distance between a reading surface of the original and an optical reading element constant. The image reading device further includes a control unit that causes, if a predetermined condition is satisfied after reading the original in the first mode, the first and the second carriages to standby at a reading position of the first mode while keeping the light source turned on, and if a next read request is issued within a predetermined time, causes the first and the second carriages to move to a next reading operation.

Furthermore, according to another aspect of the present invention, there is provided an image forming apparatus including an image reading device and an output unit that performs a printing operation based on input image data. The image reading device includes an original feeding unit that feeds a sheet-type original to a predetermined reading position, a first carriage equipped with a light source and a first mirror, a second carriage equipped with a second mirror and a third mirror, the image reading device having a first mode and a second mode, wherein in the first mode, the image reading device reads image data on the original while moving the original with the first and the second carriages stopped, and in a second mode, the image reading device reads image data on the original by moving the first and the second carriages in a sub-scanning direction while keeping a distance between a reading surface of the original and an optical reading element constant. The image reading device further includes a control unit that causes, if a predetermined condition is satisfied after reading the original in the first mode, the first and the second carriages to standby at a reading position of the first mode while keeping the light source turned on, and if a next read request is issued within a predetermined time, causes the first and the second carriages to move to a next reading operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 8:
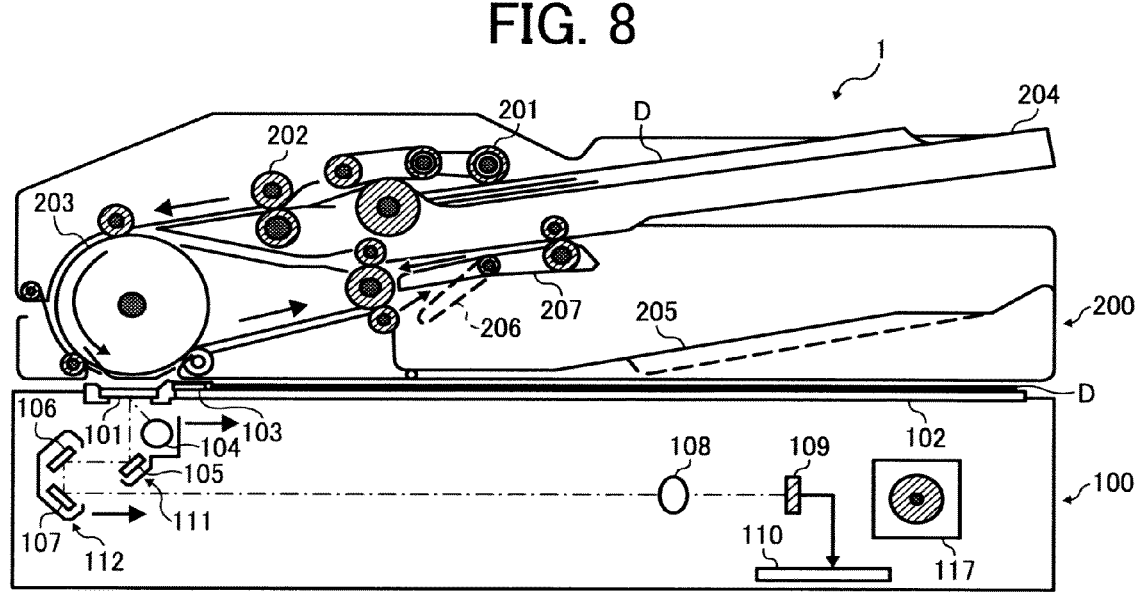
FIG. 8 is a schematic diagram of a structure of an image reading device according to the first to the sixth embodiments of the present invention.

FIG. 8 is a schematic diagram of a structure of an image reading device 1 according to a first embodiment of the present invention. As shown in FIG. 8, the image reading device 1 includes a reading unit 100 and an automatic document feeder (ADF) 200. The ADF 200 drives a pickup roller 201, a conveying roller 202, and a conveying drum 203. Due to this, a sheet shaped original D, which is placed on an original tray 204, is conveyed at a constant speed such that the original D passes a position of an original reading glass 101. The conveyed original D is ejected into a discharge tray 205. Alternately, the original D is switched back by a switchback unit 207 that is in the upper direction of the discharge tray 205 by operating a branching pawl 206. Due to this, the original D is reversed and again conveyed onto the original reading glass 101. After the image reading device has read the other surface of the original D, the original D is ejected into the discharge tray 205.

A contact glass 102, a standard white plate 103, and the original reading glass 101 are arranged on the upper side of the reading unit 100. The contact glass 102 is used for setting the original during a book original reading mode. The original reading glass 101, which is an original reading window for reading the original D that is conveyed during an original reading mode, reads the moving original D that passes the position of the original reading glass 101. Such a method is generally called a sheet through method.

The standard white plate 103 is a nearly white member of uniform density that is arranged in a main scanning direction for obtaining corrected data at the time of shading correction. An illumination lamp (light source) 104 is switched on due to application of a driving voltage from a lamp stabilizer (not shown) and irradiates a reading surface of the original D at a predetermined angle. Light, which is irradiated from the lamp 104, is reflected by the standard white plate 103 or the original D and the reflected light is incident, via first to third mirrors 105 to 107 and a lens 108, on a CCD plate 109 that includes a mounted CCD that is a photoelectric conversion element.

The CCD plate 109 includes the CCD, a clock driver, a timing signal generator, and a signal processing unit. The CCD plate 109 outputs a voltage corresponding to an incident light amount and distributes the voltage to a control plate 110 as image data. The lamp 104 and the first mirror 105 are mounted on a first carriage 111. The second and the third mirrors 106 and 107 are mounted on a second carriage 112. During a non-operation time, the first and the second carriages 111 and 112 wait at a position (a reading position of the original reading mode) shown in FIG. 8. In the original reading mode, the first and the second carriages 111 and 112 read, at an original reading position HP that is shown in FIG. 8, the original D that is conveyed by the ADF 200.

In the book original reading mode, the first and the second carriages 111 and 112 are driven by a scanner motor unit 117. The first and the second carriages 111 and 112 move in a sub-scanning direction while fixedly maintaining a distance between an original reading surface and the CCD, and read the original D that is placed on the contact glass 102. Because a reading operation is widely known, a detailed explanation is omitted.

Figure 9:
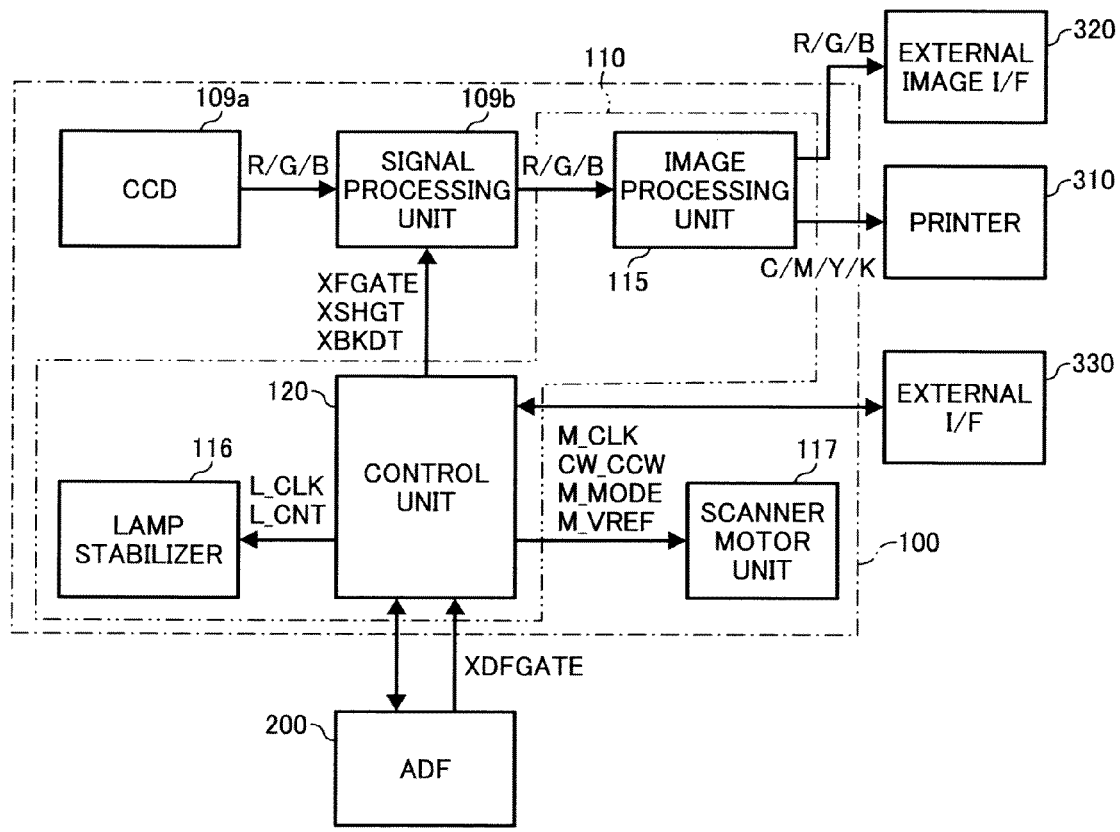
FIG. 9 is a block diagram of a control mechanism of the image reading device according to the first to the sixth embodiments of the present invention.

FIG. 9 is a block diagram of a control mechanism of the image reading device 1 according to the first embodiment. As shown in FIG. 9, the control mechanism of the image reading device 1 is centered on a control unit 120 and includes a signal processing unit 109b, an image processing unit 115, a lamp stabilizer 116, and the scanner motor unit 117. A CCD 109a is connected to the signal processing unit 109b and the signal processing unit 109b is connected to the image processing unit 115. Further, a printer 310 and an external image interface (I/F) 320 are connected to the image processing unit 115. An external I/F 330 and the ADF 200 are connected to the control unit 120. In the first embodiment, the CCD 109a and the signal processing unit 109b are mounted on the CCD plate 109 and the control unit 120, the image processing unit 115, and the lamp stabilizer 116 are mounted on the control plate 110. However, all the controlling elements mentioned earlier, including a driver of the scanner motor unit 117, can also be mounted on the control plate 110.

In the image reading device 1 having the structure mentioned earlier, an output of the CCD plate 109 is output to the printer 310 and the external image I/F 320 via the signal processing unit 109b and the image processing unit 115. The control unit 120 controls the entire image reading device 1 and each component of the image reading device 1. In control related to the present invention, the control unit 120 controls a stepping motor of the scanner motor unit 117, the signal processing unit 109b that processes CCD output signals, the image processing unit 115, the lamp 104, and the ADF 200. The control unit 120 also functions as an interface between the image reading device 1 and external devices.

In the book original reading mode, the control unit 120 causes the stepping motor to drive the first and the second carriages 111 and 112, and reads the standard white plate 103 and the original D. The control unit 120 outputs with respect to the signal processing unit 109b, signals XBKDT that indicate a black offset detection timing, signals XSHGT that indicate a standard white plate reading timing, and signals XFGATE that indicate an original reading timing. Further, the control unit 120 also outputs a lighting synchronization clock L_CLK and lighting signals L_CNT to the lamp stabilizer 116.

Figure 10:
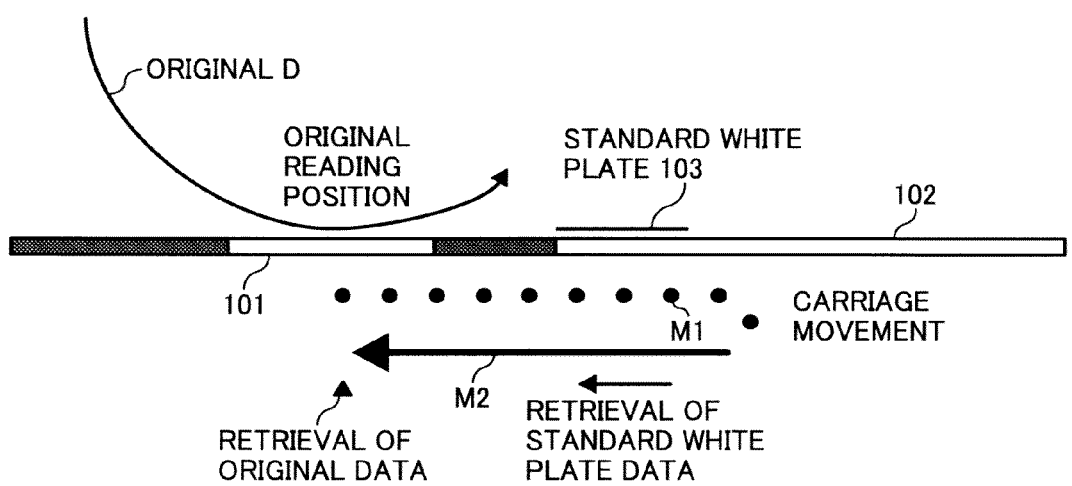
FIG. 10 is a schematic diagram for explaining an operation at the time of reading in a DF reading mode according to the present invention.

In the original reading mode, the first and the second carriages 111 and 112 read the standard white plate 103 and the original D while shuttling between the standard white plate 103 and a documented feeder (DF) original reading position HP. FIG. 10 is a schematic diagram for explaining an operation of the image reading device 1 at the time of reading in a DF reading mode. The stepping motor drives the first and the second carriages 111 and 112. The control unit 120, which controls the stepping motor, outputs to the scanner motor unit 117, signals M_VREF0 to M_VREF2 that set a motor electric current, signals M_MODE0 to M_MODE1 that set an excitation method of the stepping motor, signals CW_CCW that instruct a rotation direction, and a clock M_CLK for driving the stepping motor.

The first carriage 111, which is waiting at the DF original reading position HP (a position of the original reading glass 101), is moved in the direction of the standard white plate 103 by the stepping motor (an operation M1 that is indicated by dotted lines shown in FIG. 10). It is assumed that a movement distance during the operation M1 is at least a distance that enables the first carriage 111 to read the standard white plate 103. Next, the first carriage 111 reads the standard white plate 103 while moving in the direction of the DF original reading position HP (an operation M2 that is indicated by a continuous line shown in FIG. 10), further moves until the DF original reading position HP, and stops. After the first carriage 111 has stopped, because the original D, which is conveyed by the ADF 200, passes the DF original reading position HP (the position of the original reading glass 101) after a predetermined time, the first carriage 111 reads original data at the DF original reading position HP.

Figure 1A:
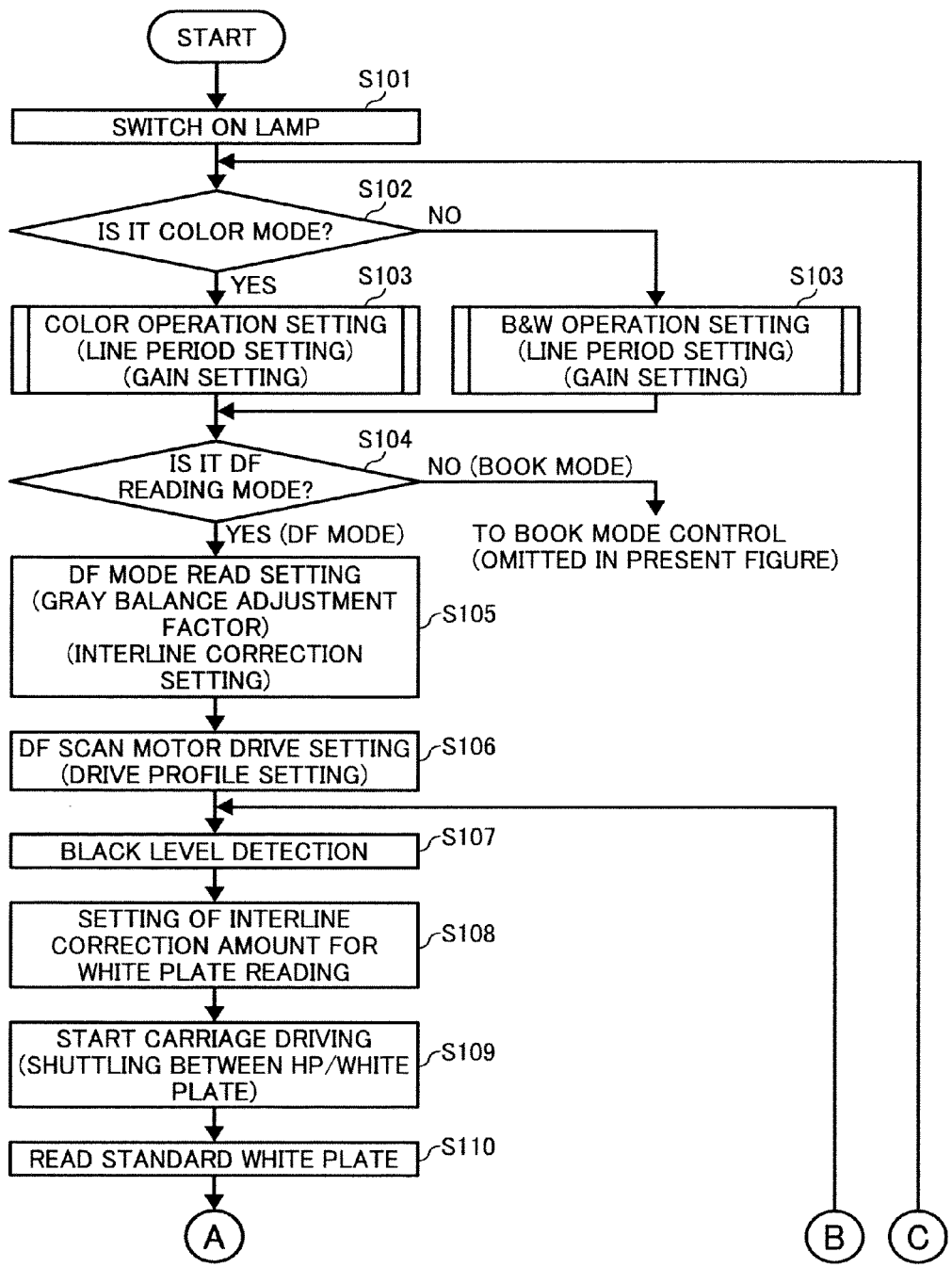
FIGS. 1A and 1B are flowcharts of a representative operation of an existing scanner.
Figure 1B:
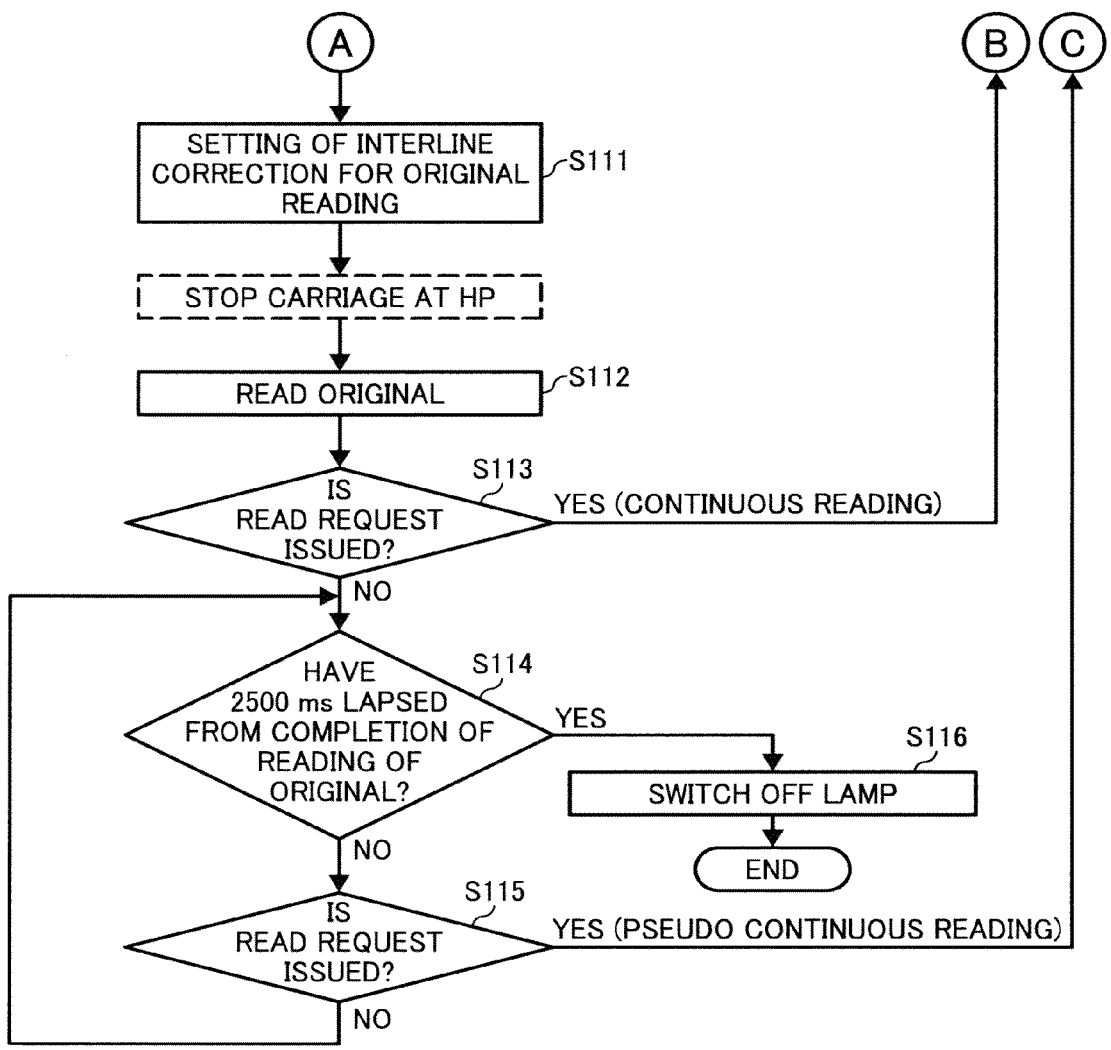
Figure 2A:
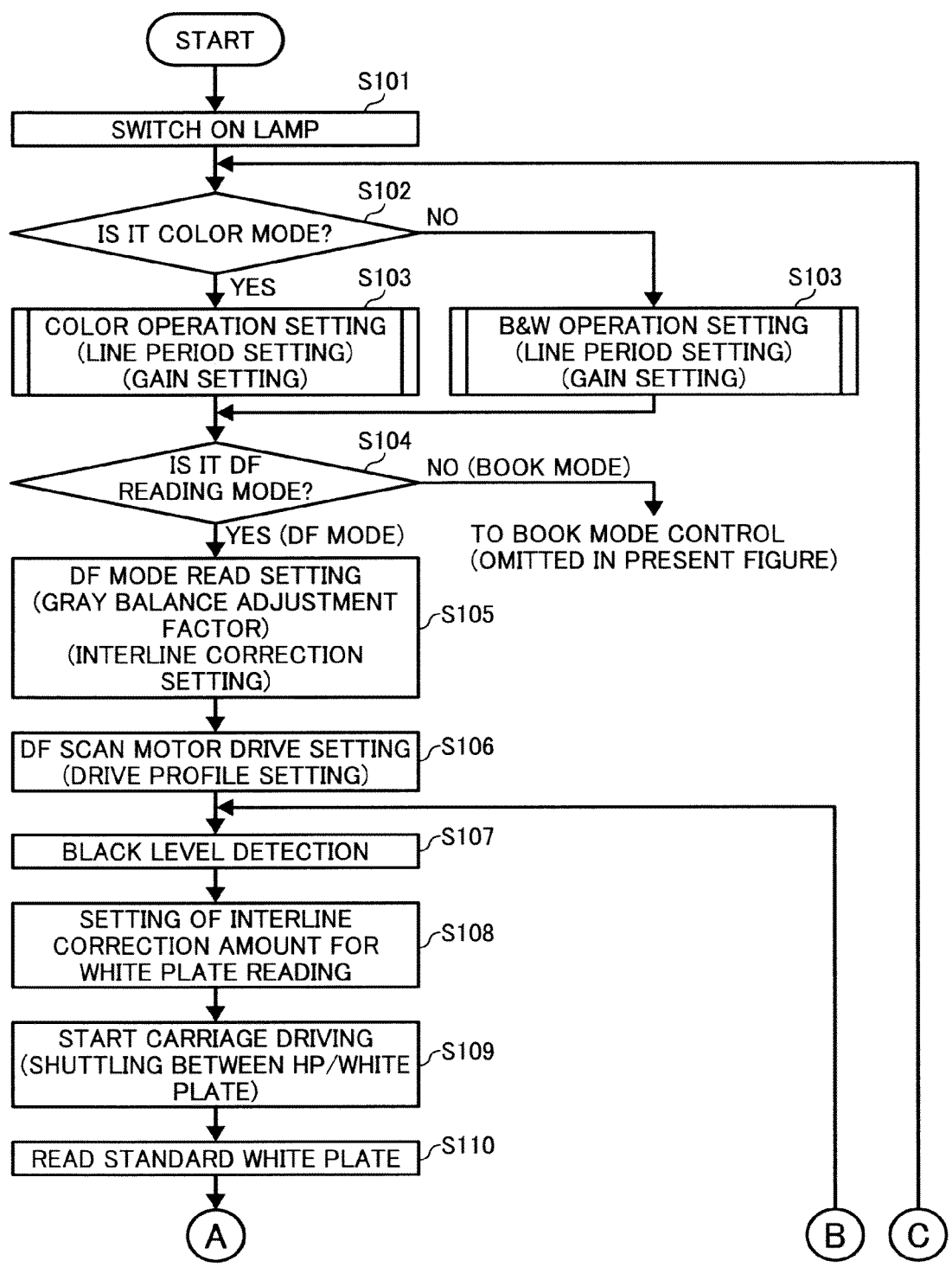
FIGS. 2A and 2B are flowcharts of a process according to a first embodiment of the present invention.
Figure 2B:
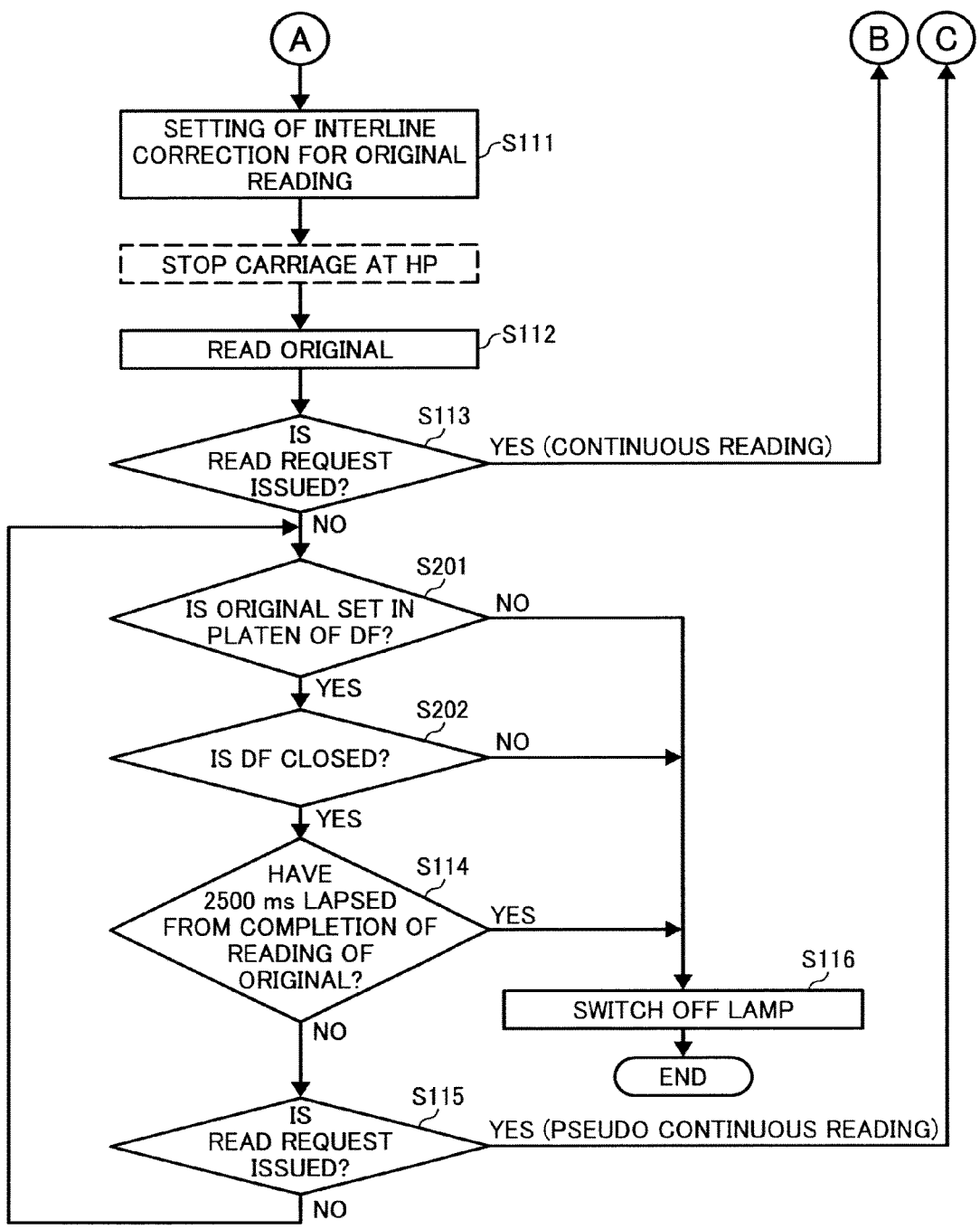

FIGS. 2A and 2B are flowcharts of a process according to the first embodiment. Compared to a process performed by an existing image reading device, in the first embodiment, after reading completion of the original in a DF mode, if predetermined conditions are satisfied, the first and the second carriages 111 and 112 await at the DF original reading position HP while the lamp 104 is still switched on. If the next read request is issued within a predetermined time, the process proceeds to the next reading operation. Compared to the process performed by the existing image reading device shown in FIGS. 1A and 1B, in the first embodiment, Steps S201 and S202 are added after Step S113 as conditions for waiting for the next read request at Step S115.

In other words, as shown in FIG. 2B, if the read request is not issued at Step S113, the image reading device 1 checks whether the original D is placed on the original tray 204 of the ADF 200 (Step S201). If the original D is not placed on the original tray 204, because continuous reading cannot be carried out, upon detecting that continuous reading cannot be carried out, the image reading device 1 switches off the lamp 104, thus ending the process. If the original D is placed on the original tray 204, the image reading device 1 further checks whether an original feeding unit of the ADF 200 is closed (Step S202). If the original feeding unit is not closed, because the original D cannot be read in the DF mode and continuous reading cannot be carried out, upon detecting that continuous reading cannot be carried out, the image reading device 1 switches off the lamp 104, thus ending the process. If the original feeding unit is closed, the process moves to Step S114 and further proceeds to the process that is explained with reference to FIGS. 1A and 1B.

According to the first embodiment, by carrying out the process at Steps S201 and S202, if reading is not carried out using the TWAIN, the lamp 104 is immediately switched off after reading completion. Thus, a lamp life can be extended.

In a second embodiment of the present invention, after reading completion of the original D in the DF mode, upon satisfaction of predetermined conditions, for example, if the original D is set in a platen of the ADF 200 and the ADF 200 is closed, the first and the second carriages 111 and 112 read the standard white plate 103 and await at the DF mode reading position HP while the lamp 104 is still switched on. If the next read request is issued within the predetermined time, the first and the second carriages 111 and 112 read the original D and carry out correction using a standard white plate data that is retrieved before.

Figure 3A:
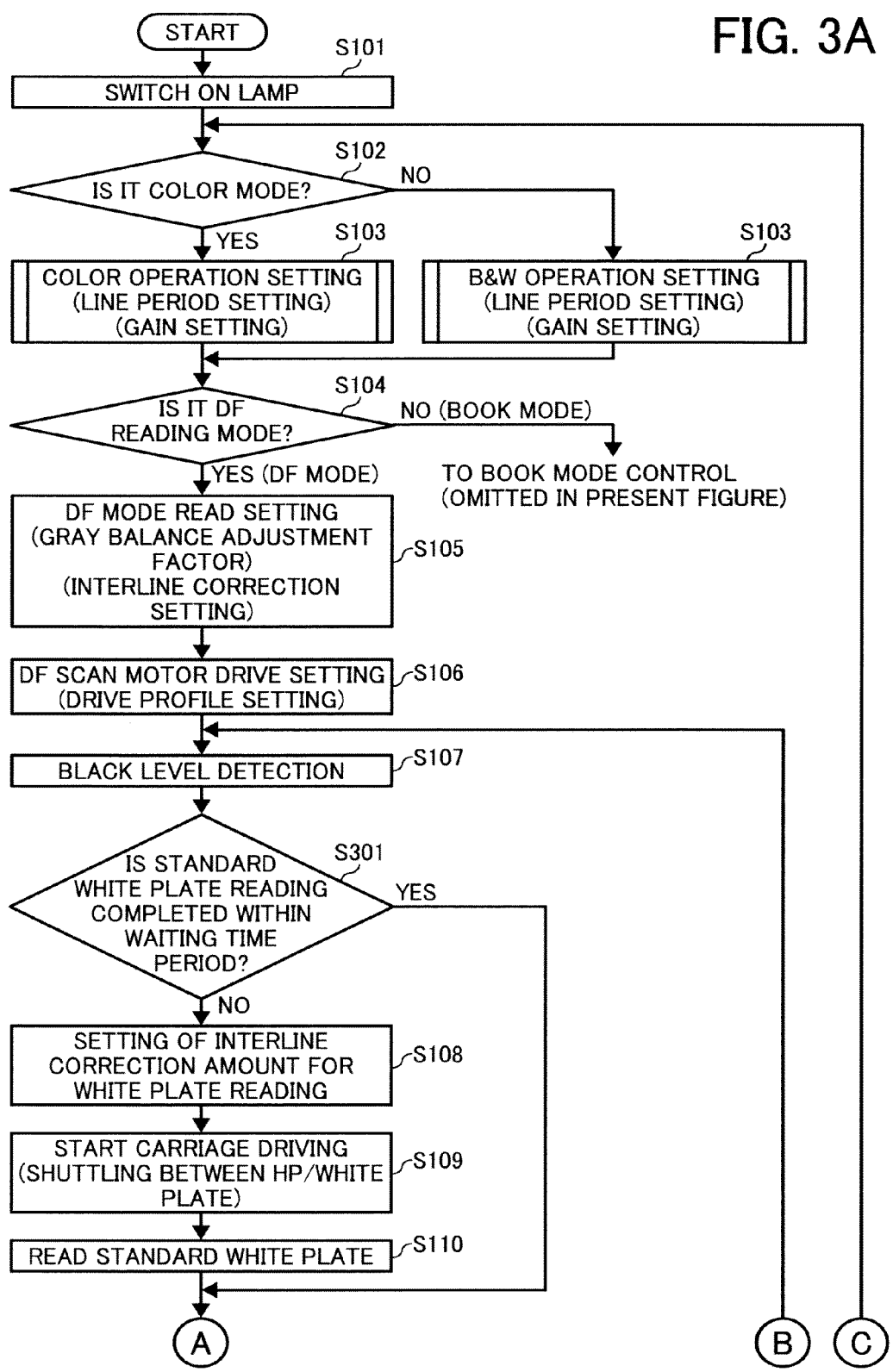
FIGS. 3A and 3B are flowcharts of an operation according to a second embodiment of the present invention.
Figure 3B:
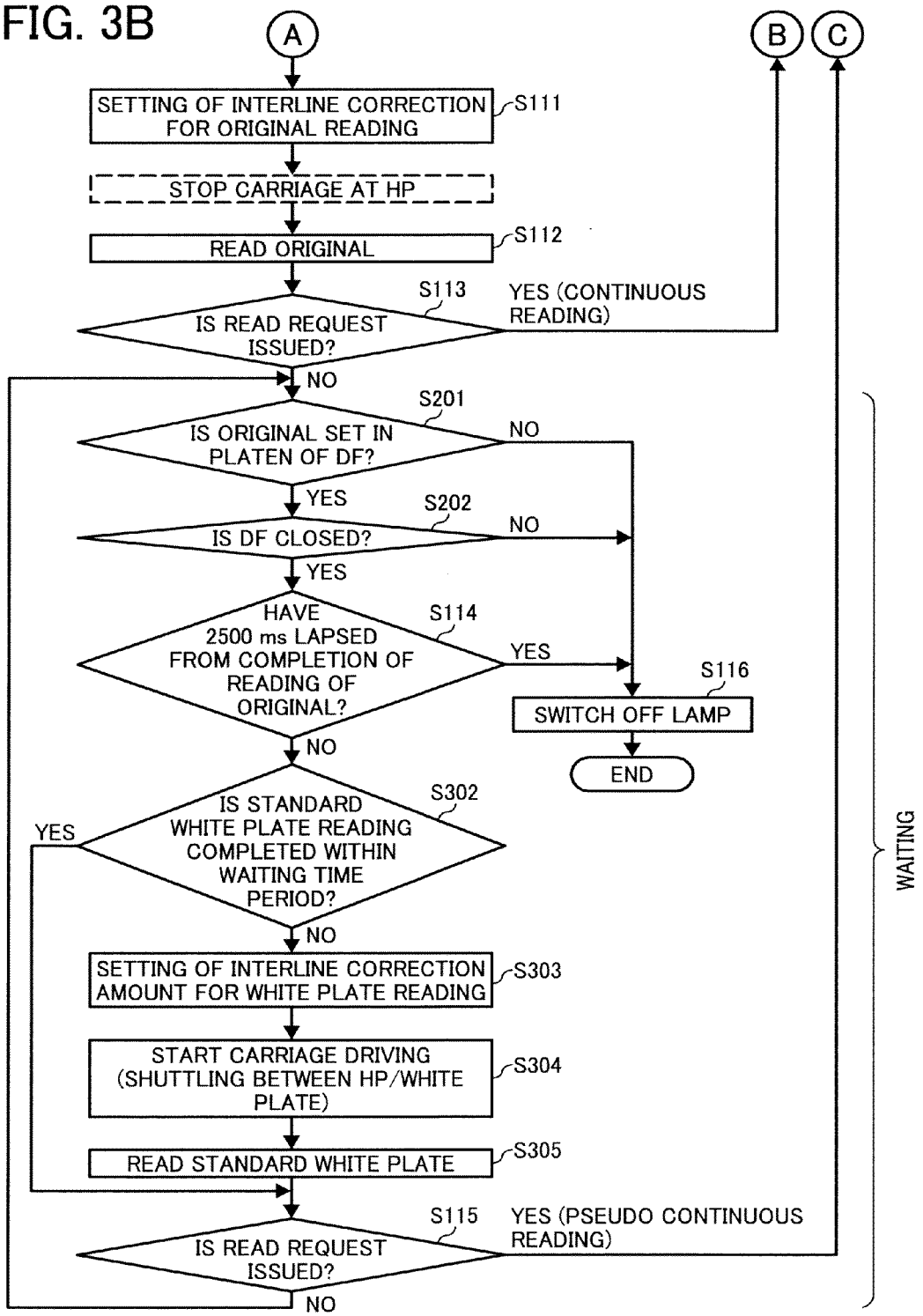

FIGS. 3A and 3B are flowcharts of a process according to the second embodiment. In the second embodiment, a determining process at Step S301 is carried out between Steps S107 and S108 in the process according to the first embodiment that is shown in FIGS. 2A and 2B. Further, a process at Steps S302 to S305 is carried out between Steps S114 and S115 in the process according to the first embodiment. The rest of the steps in the process according to the second embodiment are the same as the respective steps in the process according to the first embodiment.

In other words, after carrying out a black level detection at Step S107 shown in FIG. 3A, the control unit 120 confirms whether reading of the standard white plate data is completed while waiting during the predetermined time at Step S301. If reading of the standard white data is completed, the control unit 120 skips a process related to standard white plate reading at Steps S108 to S111, the process moves to Step S111 and the control unit 120 sets an interline correction amount for reading the original D. If reading of the standard white data is not completed, the control unit 120 sequentially executes the subsequent process after Step S108.

After carrying out the process from Step S301 to Step S114, the control unit 120 confirms whether reading of the standard white plate data is completed while waiting during the predetermined time at Step S302 shown in FIG. 3B. If reading of the standard white plate data is completed, the control unit skips a process at Steps S303 to S305 and subsequently awaits the next read request at Step S115. If reading of the standard white plate data is not completed at Step S302 and the standard white plate data is still not read while waiting during the predetermined waiting period at Steps S303 to S305, the control unit 120 executes the standard white plate reading. In other words, after setting the interline correction amount for reading the standard white plate 103, the control unit 120 drives the stepping motor, causes the first and the second carriages 111 and 112 to read the standard white plate 103 while shuttling the first and the second carriages 111 and 112 between the DF original reading position HP and the standard white plate 103, and subsequently awaits the next read request at the DF original reading position HP.

The rest of the components, the functions, and the processes in the second embodiment are the same as the respective components, the respective functions, and the respective processes in the first embodiment.

According to the second embodiment, the process at Steps S302 to S305 and determination at Step S301 enables to omit the process at Steps S108 to S110 and to immediately read the original D. Further, because a standard white plate reading operation is carried out until the next read request is issued, productivity can be further enhanced.

Because freshness of data within the predetermined waiting time (2500 ms) is guaranteed for the standard white plate data, corrected original data becoming data having significant noise, due to temperature characteristics of lamp luminance as explained in Japanese Patent Publication No. 3553363, can be prevented.

In a third embodiment of the present invention, if a currently requested reading mode differs from a previous reading mode (a color mode or a B&W mode), the first and the second carriages 111 and 112 newly read the standard white plate data and subsequently read the original D.

Figure 4A:
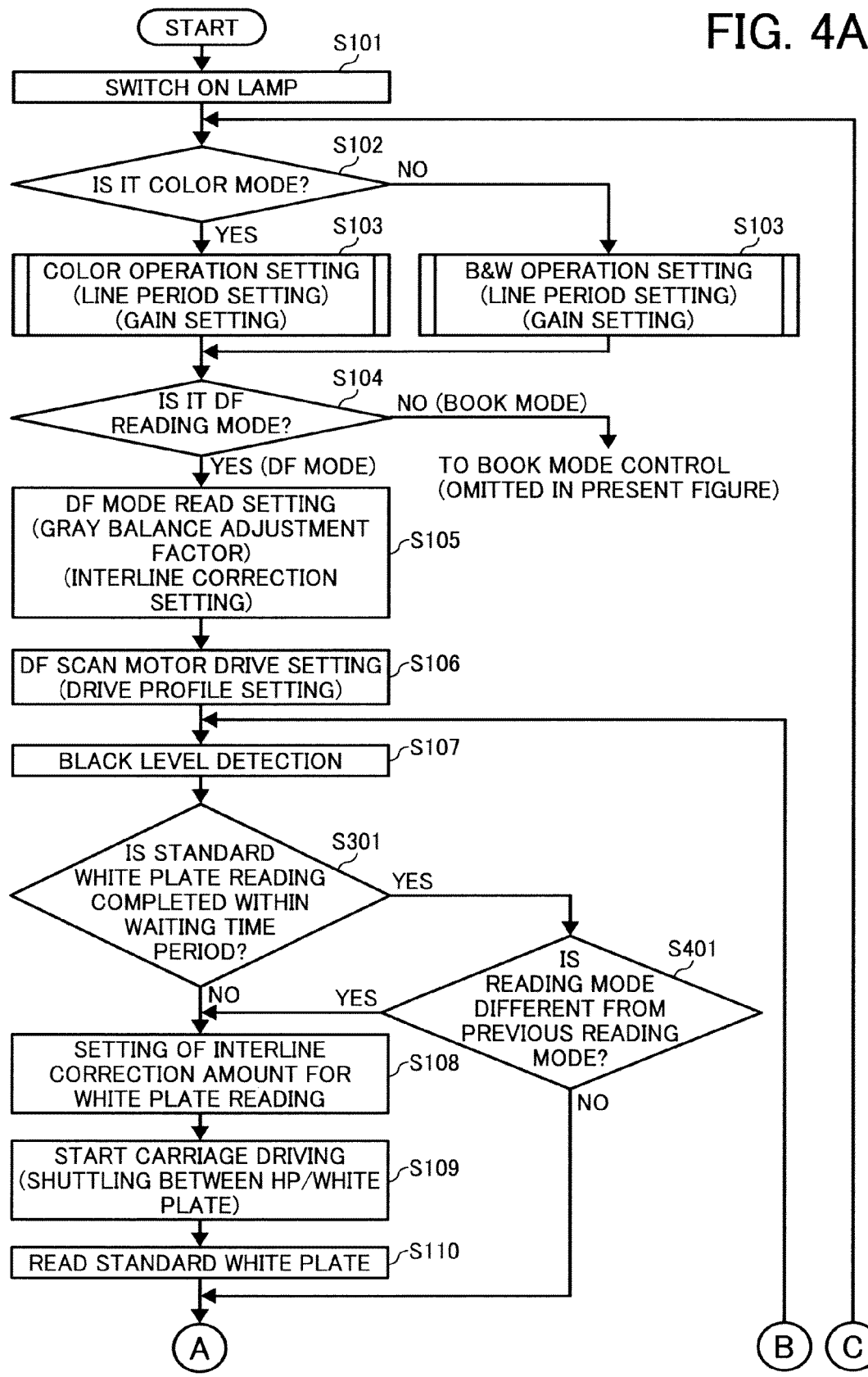
FIGS. 4A and 4B are flowcharts of an operation according to a third embodiment of the present invention.
Figure 4B:
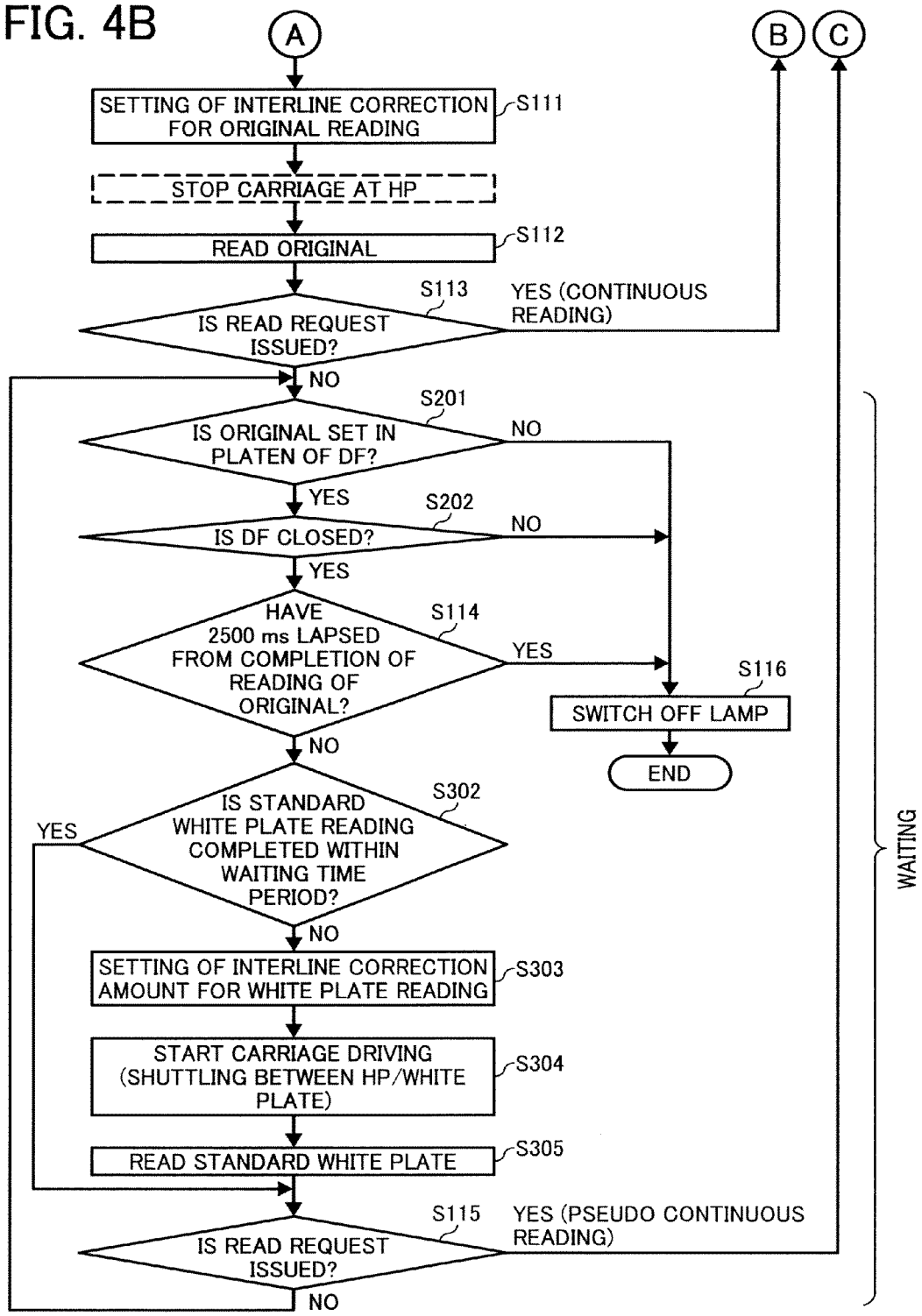

FIGS. 4A and 4B are flowcharts of a process according to the third embodiment. In the third embodiment, a determination at Step S401 is further added with respect to a determination result at Step S301 in the second embodiment that is shown in FIGS. 3A and 3B. The rest of the steps are the same as the respective steps of the process shown in FIGS. 3A and 3B. In other words, the control unit 120 confirms whether the standard white plate data has been read while waiting at Step S301 shown in FIG. 4A. If the standard white plate data has not been read, the control unit 120 unconditionally reads the standard white plate data after Step S108. If the standard white plate data has been read, the control unit 120 determines whether the current reading mode (the color mode or the B&W mode) at Step S401 is the same as the previous reading mode. If the current reading mode differs from the previous reading mode, the process moves to Step S108 and the control unit 120 causes the first and the second carriages 111 and 112 to read the standard white plate data. If the current reading mode is the same as the previous reading mode, the control unit 120 skips the process at Steps S108 to S110 and the process proceeds to the process after Step S111.

The rest of the components and the functions in the third embodiment are the same as the respective components and the respective functions in the first embodiment unless specifically explained. Further, the rest of the processes in the third embodiment are the same as the respective processes in the first and the second embodiments unless specifically explained.

According to the third embodiment, executing the process at Step S401 enables to prevent a mismatch of white standard (shading correction) data due to a difference between the reading modes. Due to this, a stable image can be obtained. Further, because the standard white plate data is read again only if the reading mode is changed, original data can be obtained after shading correction that is within a normal range of read density reproduction.

In a fourth embodiment of the present invention, the control unit 120 causes the first and the second carriages 111 and 112 to read the standard white plate data once again only if the requested reading mode is changed from the B&W mode to the color mode and subsequently causes the first and the second carriages 111 and 112 to read the original D.

Figure 5A:
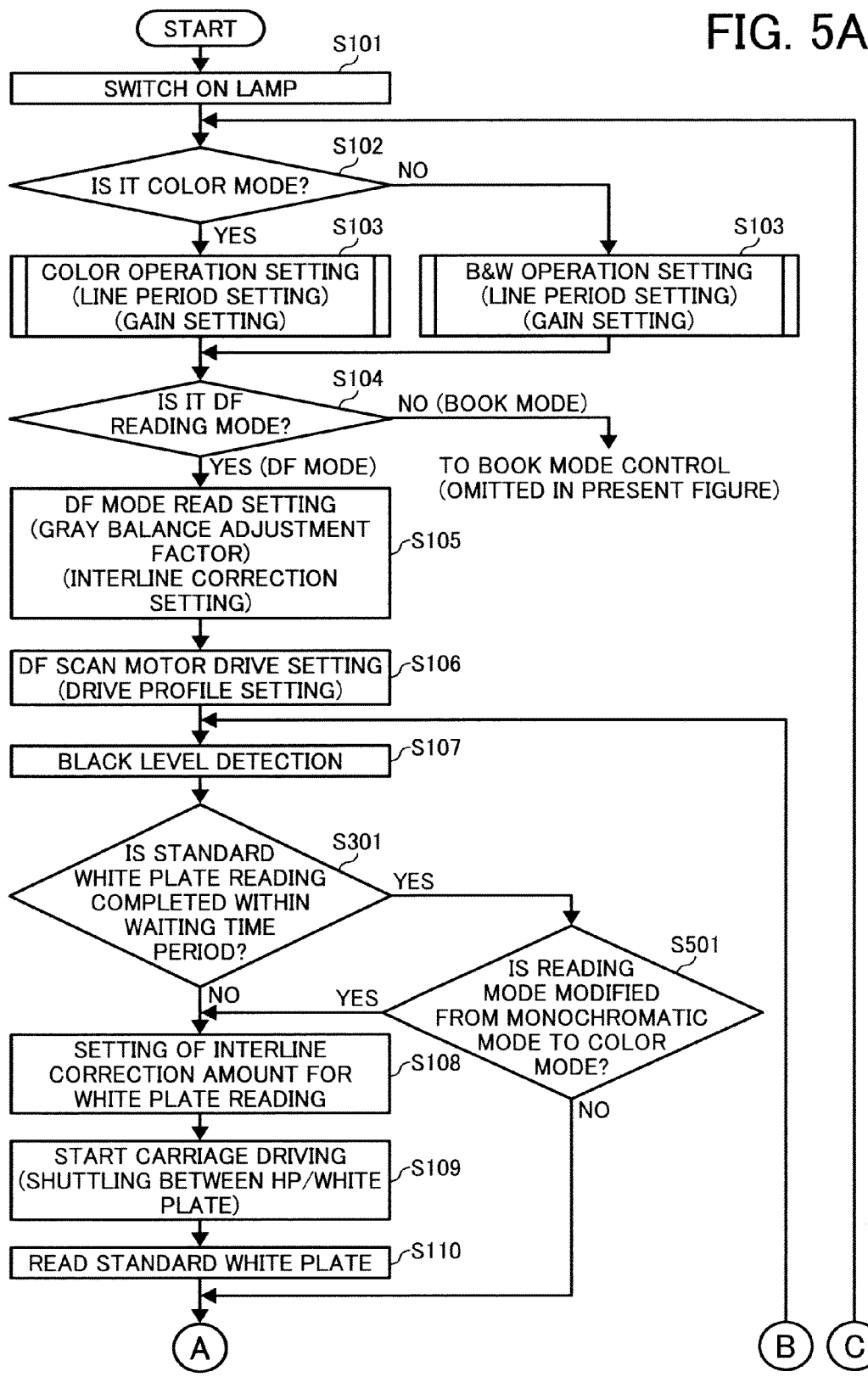
FIGS. 5A and 5B are flowcharts of an operation according to a fourth embodiment of the present invention.
Figure 5B:
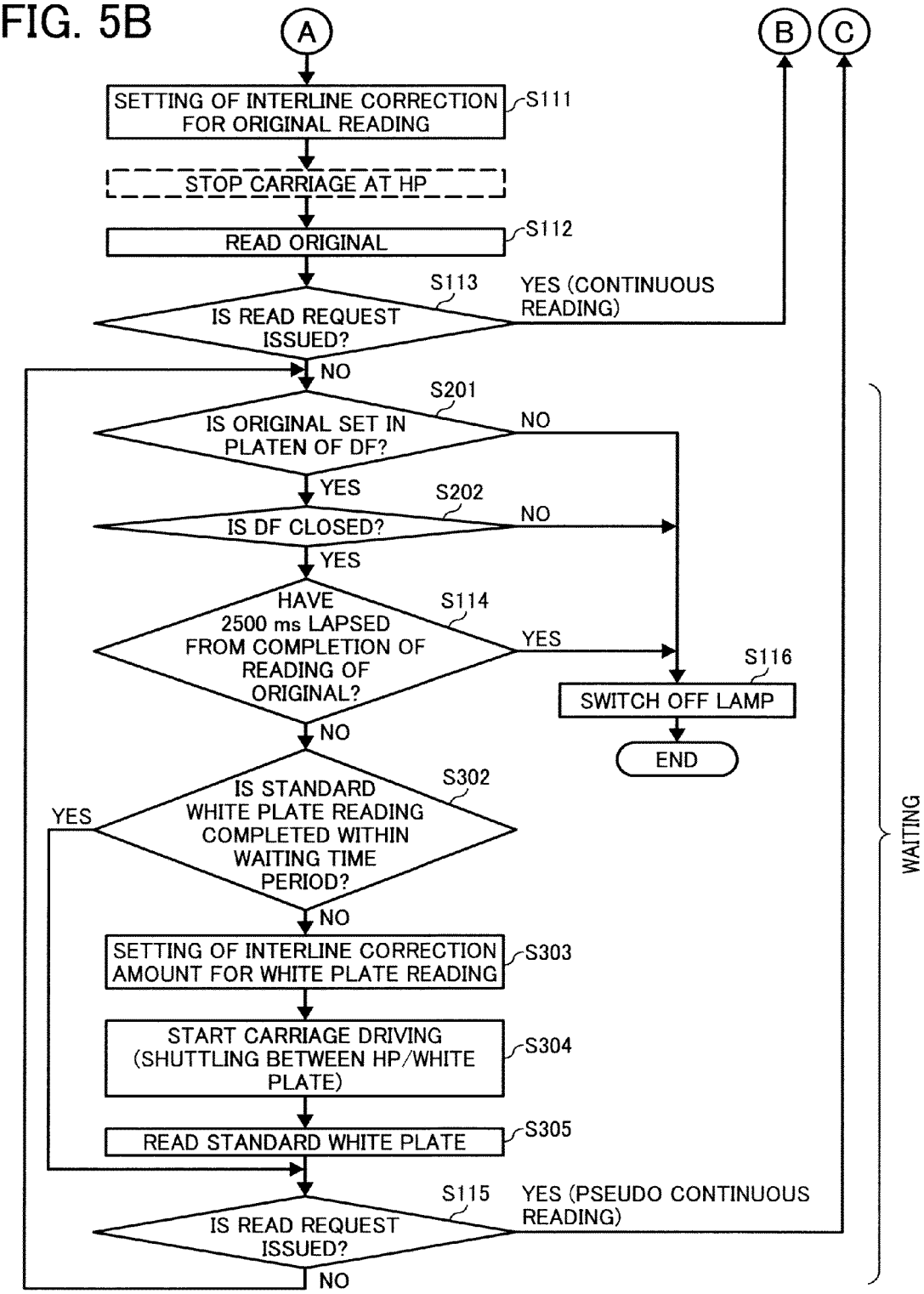

FIGS. 5A and 5B are flowcharts of a process according to the fourth embodiment. In the fourth embodiment, Step S401 of the process shown in FIGS. 4A and 4B is substituted by Step S501 and the rest of the steps are the same as the respective steps of the process shown in FIGS. 4A and 4B. In other words, the control unit 120 confirms whether the standard white plate data has been read while waiting at Step S301 that is shown in FIGS. 5A and 5B. If the standard white plate data has not been read, the control unit 120 unconditionally executes reading of the standard white plate data after Step S108. If the standard white plate data has been read, the control unit 120 determines, at Step S501, whether the previous reading mode is the B&W mode and the current reading mode is the color mode. If the current reading mode is the color mode, the control unit 120 executes reading of the standard white plate data after Step S108. If the current reading mode is not the color mode, the control unit 120 skips the process at Step S111 and executes the subsequent process after Step S111.

Changes other than the change from the B&W mode to the color mode are permitted at Step S501. Although reading reproduction density areas are the same for both the B&W mode and the color mode, generally, a linear speed of the B&W mode is greater for enhancing productivity. Due to this, a signal to noise ratio of data that is read in the B&W mode deteriorates. If the data, which is read in the B&W mode, is used to carry out shading correction of the original data that is read in the color mode, the signal to noise ratio of the corrected original data deteriorates, thus resulting in a coarse image. However, executing the process at Step S501 enables to prevent formation of the coarse image and a stable image can be obtained.

The rest of the components and the functions in the fourth embodiment are the same as the respective components and the respective functions in the first embodiment unless specifically explained. Further, the rest of the process in the fourth embodiment is the same as the process in the third embodiment unless specifically explained.

According to the fourth embodiment, if the reading mode is changed from the color mode to the B&W mode, because shading correction is carried out using white plate data having a good signal to noise ratio, occurrence of image quality deterioration can be prevented. Further, because a necessity to once again read the standard white plate data is removed, a significant reduction in the productivity can be prevented and a desirable image can be obtained.

In a fifth embodiment of the present invention, if the currently requested reading mode is changed with respect to the previous reading mode (the color mode or the B&W mode), the control unit 120 can select whether to read the original D after newly reading the standard white plate data or whether to read the original D without newly reading the standard white plate data.

Figure 6A:
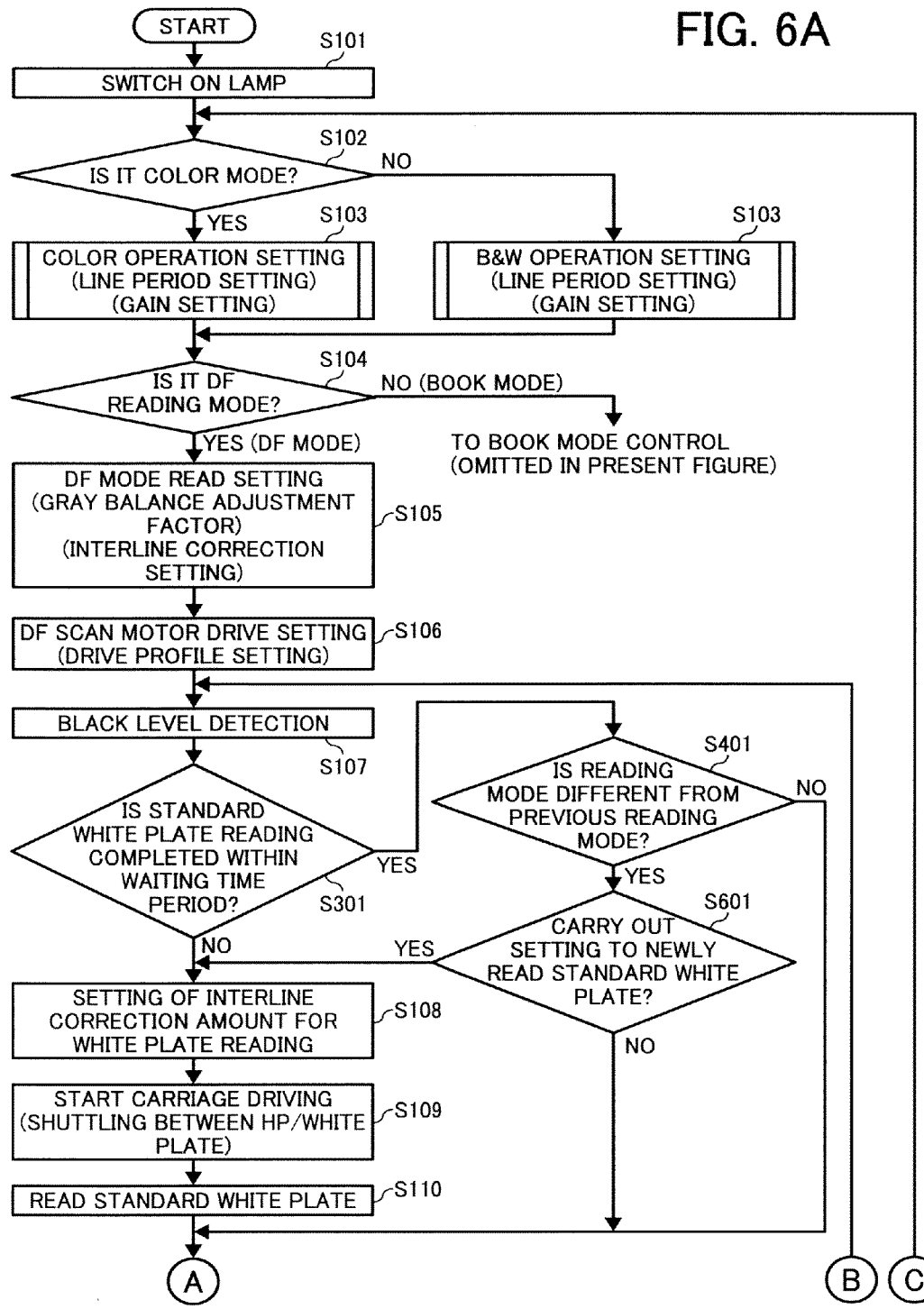
FIGS. 6A and 6B are flowcharts of an operation according to a fifth embodiment of the present invention.
Figure 6B:
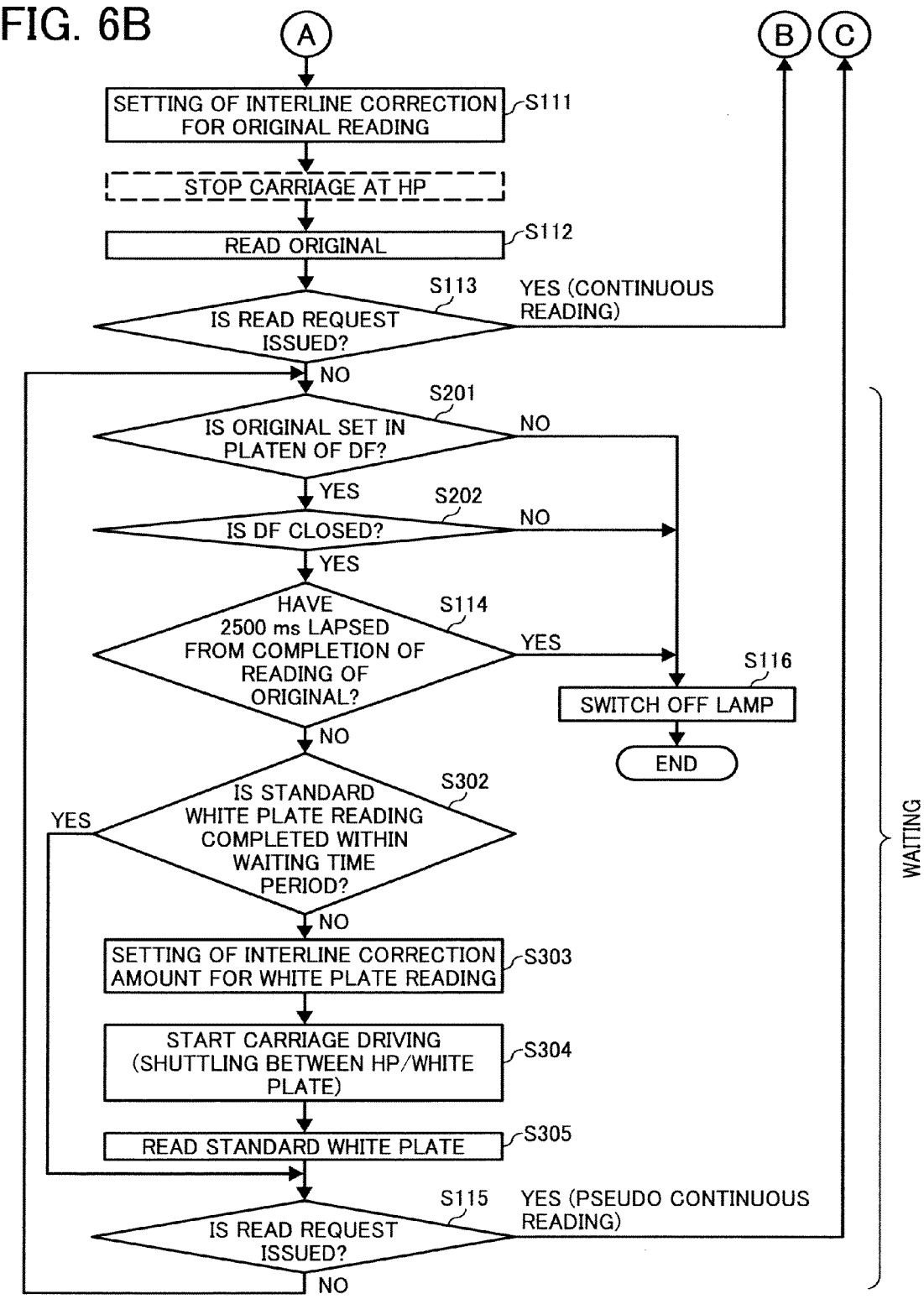

FIGS. 6A and 6B are flowcharts of a process according to the fifth embodiment. In the fifth embodiment, a determination at Step S601 is added after Step S401 in the process shown in FIGS. 4A and 4B. In other words, the control unit 120 determines, at Step S401 shown in FIG. 6A, whether the current reading mode (the color mode or the B&W mode) is the same as the previous reading mode. If the currently requested reading mode is changed with respect to the previous reading mode (the color reading mode or the B&W reading mode), the control unit 120 determines whether to newly read the standard white plate data. Upon determining to newly read the standard white plate data, the process moves to Step S108 and the control unit 120 executes reading of the standard white plate data. Upon determining not to newly read the standard white plate data, the control unit 120 skips the process at Steps S108 to S110 and the process proceeds to the process after Step S111. A user sets whether to newly read the standard white plate data from an operation panel of an image forming apparatus (not shown).

The rest of the components and the functions in the fifth embodiment are the same as the respective components and the respective functions in the first embodiment unless specifically explained. Further, the rest of the process in the fifth embodiment is the same as the process in the third embodiment unless specifically explained.

According to the fifth embodiment, whether to newly read the standard white plate 103 can be selected according to a preference of the user based on whether to give priority to productivity or to image quality. Due to this, the user's usability can be enhanced.

In a sixth embodiment of the present invention, after reading completion of the original D in the DF mode, if predetermined conditions are satisfied, the control unit 120 causes, without switching off the lamp 104, the first and the second carriages 111 and 112 to move to a standard white plate position and to wait for a predetermined time. If the next read request is issued within the predetermined time, the control unit 120 causes the first and the second carriages 111 and 112 to read the standard white plate 103 and the original D. If the next read request is issued within the waiting status, the control unit 120 causes the first and the second carriages 111 and 112 to move to the DF original reading position HP and switches off the lamp 104.

Figure 7A:
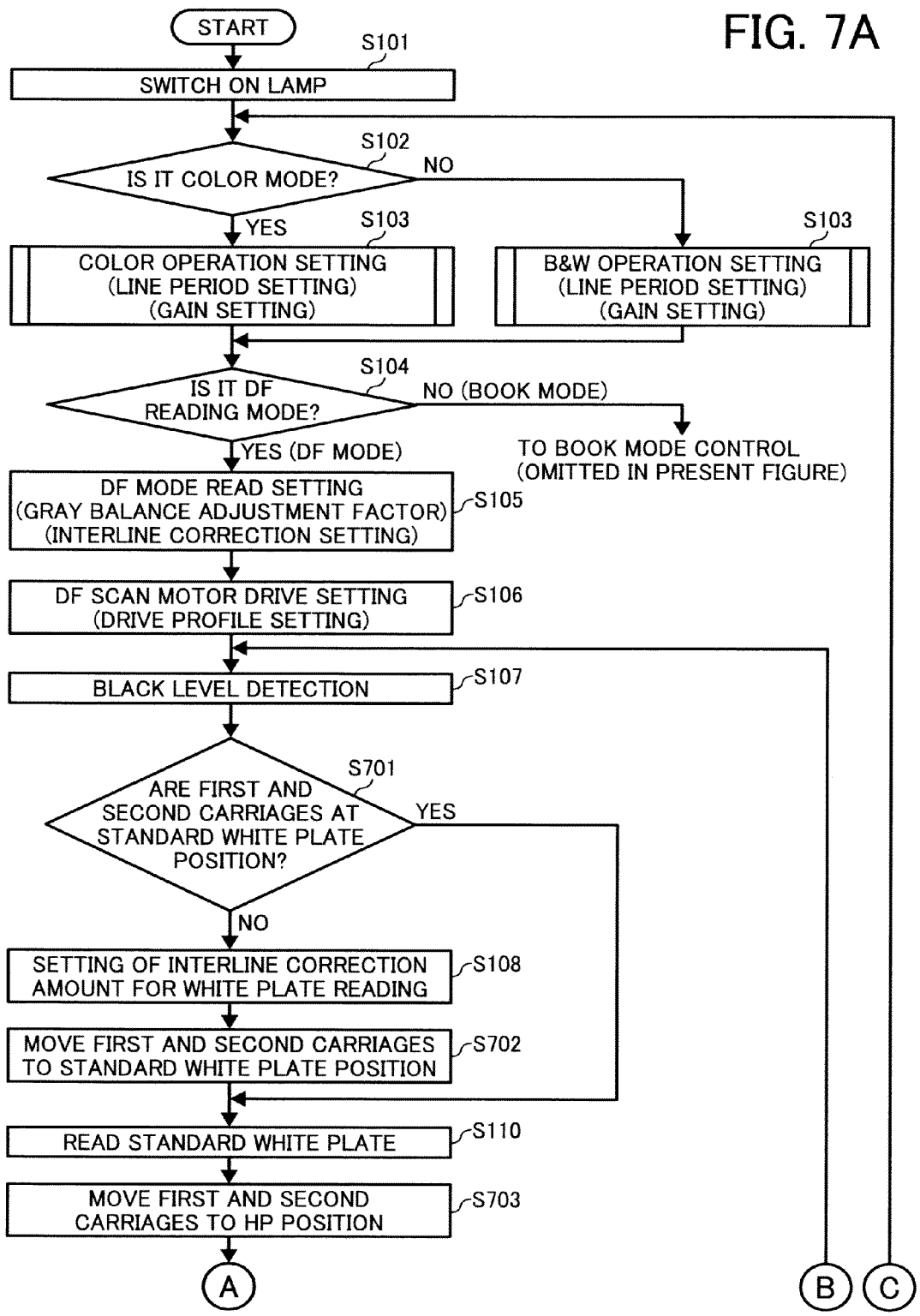
FIGS. 7A and 7B are flowcharts of an operation according to a sixth embodiment of the present invention.
Figure 7B:
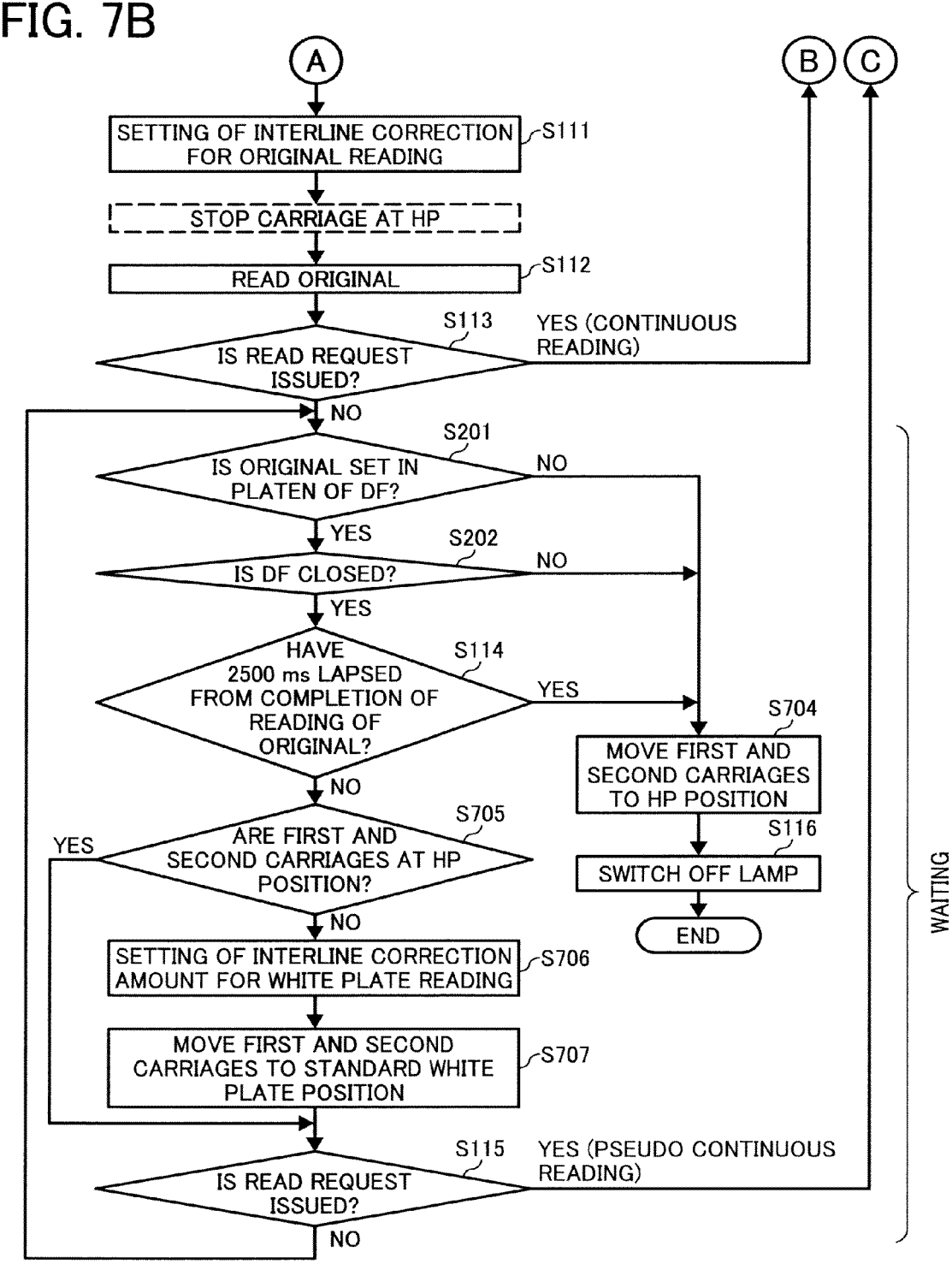

FIGS. 7A and 7B are flowcharts of a process according to the sixth embodiment. Compared to the process in the first embodiment, in the sixth embodiment, the control unit 120 causes the first and the second carriages 111 and 112 to move to the standard white plate position and to wait for issuing of the next read request. Due to this, compared to the flowcharts shown in FIGS. 2A and 2B, a determination at Step S701 is added after Step S107, Step S109 is substituted by a process at Step S702, and a process at Step S703 is added after Step S110. Further, Steps S705 to S707 are added between Steps S114 and S115 and Step S704 is added before Step S116.

As shown in FIGS. 7A and 7B, after carrying out the black level detection at Step S107, the control unit 120 confirms whether the first and the second carriages 111 and 112 are positioned at the standard white plate position. If the first and the second carriages 111 and 112 are positioned at the standard white plate position, because a necessity to move the first and the second carriages 111 and 112 is removed, the control unit 120 causes the first and the second carriages 111 and 112 to read the standard white plate 103. If the first and the second carriages 111 and 112 are not positioned at the standard white plate position, for moving the first and the second carriages 111 and 112, the control unit 120 sets at Step S108, the interline correction amount for reading the standard white plate 103 and causes the first and the second carriages 111 and 112 to move to the standard white plate position at Step S702. Next, the control unit 120 causes the first and the second carriages 111 and 112 to read the standard white plate 103 at Step S110, causes the first and the second carriages 111 and 112 to move to the DF original reading position HP at Step S703, and executes the subsequent process after Step S111.

As shown in FIG. 7B, if the predetermined waiting time has not lapsed at Step S114, the control unit 120 confirms at Step S705 whether the first and the second carriages 111 and 112 are at the standard white plate position. If the first and the second carriages 111 and 112 are at the standard white plate position, the process moves to Step S115. If the first and the second carriages 111 and 112 are not at the standard white plate position, the control unit 120 sets at Step S706, the interline correction amount for reading the standard white plate 103, causes the first and the second carriages 111 and 112 to move to the standard white plate position at Step S707, and causes the process to move to Step S115. If the conditions for waiting are not satisfied at Steps S201, S202, and S203, when exiting from the waiting status, the control unit 120 causes the first and the second carriages 111 and 112 to move to the DF original reading position HP at Step S704, and switches off the lamp 104 at Step S116.

The rest of the components, the functions, and the processes in the fifth embodiment are the same as the respective components, the respective functions, and the respective processes in the first embodiment unless specifically explained.

According to the sixth embodiment, the first and the second carriages 111 and 112 wait at the standard white plate position until issuing of the next read request, and the first and the second carriages 111 and 112 can read the standard white plate 103 simultaneously with the issuing of the next read request. In other words, because a time to move from the DF original reading position to the standard white plate position is omitted, productivity is enhanced. Further, because the lamp 104 is not switched on unnecessarily, extreme lamp life reduction can be prevented.

Although the image reading device 1 is explained in the embodiments mentioned earlier, a copier can be formed by combining the image reading device 1 and the printer 310. Further, connecting a network to the external I/F 330 enables the image reading device 1 to function as a network scanner. Connecting a personal computer to the external I/F 330 enables the image reading device 1 to function as a stand-alone scanner. Connecting a public line to the external image I/F 320 and enabling printer output enables the image reading device 1 to function as a facsimile. Due to this, in the embodiments mentioned earlier, an image forming apparatus can be formed that is centered on the image reading device 1.

Thus, according to the first to the sixth embodiments mentioned earlier, only upon satisfaction of predetermined conditions, in other words, when an original is set into a platen of an ADF and the ADF is closed, a first and a second carriage wait while a lamp is kept switched on. Due to this, productivity of reading using the TWAIN can be enhanced and a long lamp life can be ensured. Further, the standard white plate reading operation is carried out until the next read request is issued. Due to this, productivity of reading using the TWAIN can be further enhanced. Further, the standard white plate data is newly read only if the reading mode is changed. Due to this, the original data can be obtained after shading correction that is within the normal range of read density reproduction.

Further, the original is read after newly reading the standard white plate data only if the requested reading mode is changed from the B&W mode to the color mode. Due to this, a significant reduction in productivity can be prevented and a desirable image can be obtained. Further, a priority to productivity or a priority to image quality can be selected. Due to this, a usage method according to the user's preference can be realized. Further, the first and the second carriages wait at the standard white plate position until the next read request is issued, and can read the standard white plate simultaneously with the issuing of the next read request. Due to this, the time to move from the home position HP to the standard white plate position can be omitted and productivity can be further enhanced. Further, upon satisfaction of the predetermined conditions, a control unit causes the first and the second carriages to wait at a reading position of a first mode, and causes the first and the second carriage to carry out a reading operation of an image only if the next read request is issued within the predetermined waiting time. Due to this, a lamp life can be extended without reducing productivity of reading.

According to one aspect of the present invention, only upon satisfaction of predetermined conditions (an original is set on a platen of a document feeder (DF) and the DF is closed), a first and a second carriages await a read request while a lamp is kept switched on. Due to this, productivity can be enhanced and a long lamp life can be ensured.

Furthermore, according to another aspect of the present invention, a standard white plate reading operation is carried out until a next read request is issued. Due to this, productivity can be further enhanced.

Moreover, according to still another aspect of the present invention, standard white plate data is newly read only if a reading mode is changed. Due to this, original data can be obtained after shading correction that is within a normal range of read density reproduction.

Furthermore, according to still another aspect of the present invention, the original is read after newly reading the standard white plate data only if the requested reading mode is changed from a B&W mode to a color mode. Due to this, a significant reduction in productivity can be prevented and a desirable image can be obtained.

Moreover, according to still another aspect of the present invention, a priority to productivity or a priority to image quality can be selected. Due to this, a usage method according to a user's preference can be realized.

Furthermore, according to still another aspect of the present invention, the first and the second carriages wait at a standard white plate position until the next read request is issued, and can read the standard white plate simultaneously with the issuing of the next read request. Due to this, (because a time to move from a home position (HP) to the standard white plate position is omitted) productivity is enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
an original feeding unit that feeds a sheet-type original to a predetermined reading position;
a first carriage including a light source and a first mirror;
a second carriage including a second mirror and a third mirror; and
a control unit which operates the image reading device in a first mode and a second mode, in the first mode, the control unit causes the image reading device to read image data on the original while moving the original with the first and the second carriages stopped, and in a second mode, the control unit causes the image reading device to read image data on the original by moving the first and the second carriages in a sub-scanning direction while keeping a distance between a reading surface of the original and an optical reading element constant, the control unit further causes, if a predetermined condition is satisfied after reading the original in the first mode, the first and the second carriages to standby at a reading position of the first mode while keeping the light source turned on, and if a next read request is issued within a predetermined time, causes the first and the second carriages to move to a next reading position.

2. The image reading device according to claim 1, wherein the control unit causes the first and the second carriages to standby after reading a standard white plate to obtain standard white plate data, and if the next read request is issued within the predetermined time, causes the first and the second carriages to move to the next reading position to read the original, and corrects read data using the standard white plate data.

3. The image reading device according to claim 2, wherein the image reading device includes two reading modes including a color mode and a black-and-white mode, and when a currently requested reading mode is different from a previous reading mode, the control unit causes the standard white plate to be newly read before reading the original.

4. The image reading device according to claim 3, wherein the control unit causes the standard white plate to be newly read when the previous reading mode is the black-and-white mode and the currently requested mode is the color mode.

5. The image reading device according to claim 1, wherein the predetermined condition is a status in which the original is set in the original feeding unit and the original feeding unit can feed the original to the reading position of the original in a closed state with respect to a reading side.

6. The image reading device according to claim 1, wherein the image reading device includes two reading modes including a color mode and a black-and-white mode, the image reading device further comprises a selecting unit that selects, when a currently requested reading mode is different from a previous reading mode, a read process from a first read process in which the original is read after newly reading the standard white plate and a second read process in which the original is read without newly reading the standard white plate, and the control unit executes a read process selected by the selecting unit.

7. The image reading device according to claim 1, wherein the control unit causes, if the predetermined condition is satisfied after reading the original in the first mode, the first carriage to move to a standard white plate position while keeping the light source turned on, causes the first carriage to standby at a position of the standard white plate, and if the next read request is issued within the predetermined time, causes the standard white plate and the original to be read.

8. The image reading device according to claim 1, wherein if the next read request is not issued within the predetermined time, the control unit causes the first and the second carriages to move to the reading position of the first mode and turns the light source off.

9. An image forming apparatus comprising:
an image reading device including
an original feeding unit that feeds a sheet-type original to a predetermined reading position,
a first carriage equipped with a light source and a first mirror,
a second carriage equipped with a second mirror and a third mirror, and
a control unit which operates the image reading device in a first mode and a second mode, in the first mode, the control unit causes the image reading device to read image data on the original while moving the original with the first and the second carriages stopped, and in a second mode, the control unit causes the image reading device to read image data on the original by moving the first and the second carriages in a sub-scanning direction while keeping a distance between a reading surface of the original and an optical reading element constant, the control unit further causes, if a predetermined condition is satisfied after reading the original in the first mode, the first and the second carriages to standby at a reading position of the first mode while keeping the light source turned on, and if a next read request is issued within a predetermined time, causes the first and the second carriages to move to a next reading position; and
an output unit that performs a printing operation based on input image data.

* * * * *